I. C. STORY.

Dummy Engine.

No. 2,200. Reissued Mar. 13. 1866.

Witnesses:

Wm. Slaughter
A. J. Gibson

Inventor:

Ira C. Story

AN, PHOTO-LITHO. CO. N.Y. (OSBORNE'S PROCESS.)

UNITED STATES PATENT OFFICE.

IRA C. STORY AND GEORGE W. SKAATS, OF CINCINNATI, OHIO, ASSIGNEES OF IRA C. STORY.

IMPROVEMENT OF RUNNING-GEARS OF STREET-LOCOMOTIVES.

Specification forming part of Letters Patent No. 51,098, dated November 21, 1865; Reissue No. 2,200, dated March 13, 1866.

*To all whom it may concern:*

Be it known that IRA C. STORY, of Cincinnati, Hamilton county, and State of Ohio, has invented a new and useful Improvement in Locomotives, of which the following is a full, clear, and exact description, reference being had to the accompanying drawings, forming a part of this specification, in which—

Figure 1:
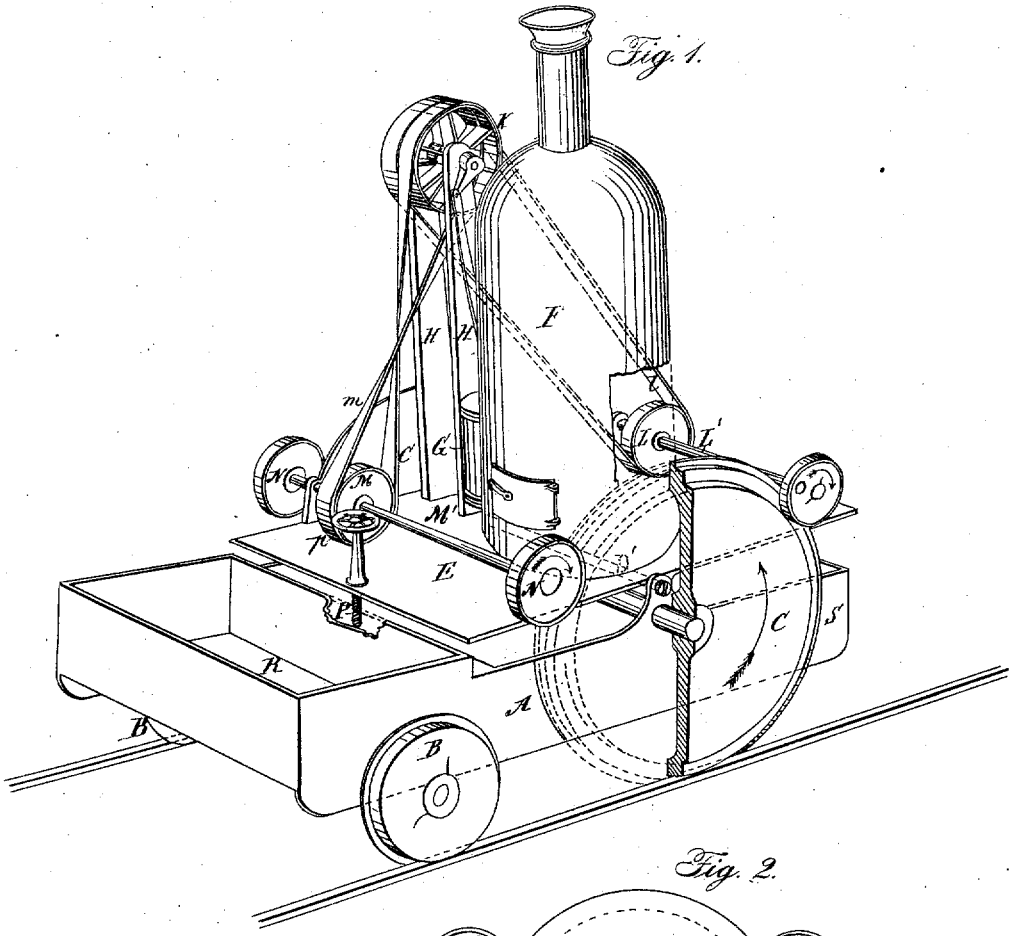
Figure 2:
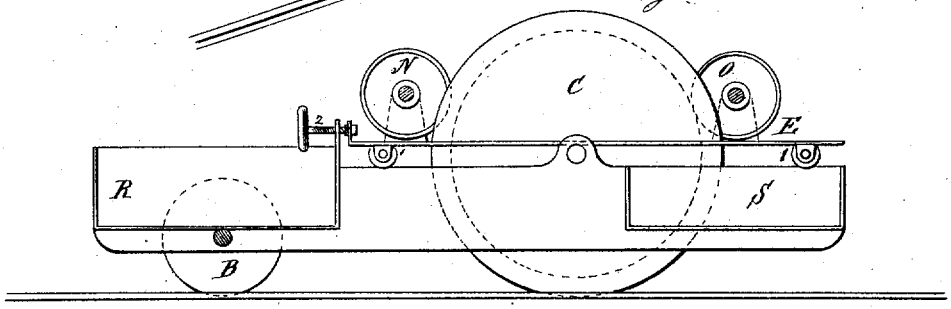

Figure 1 is a perspective view of my improvement. Fig. 2 is a longitudinal section through part of the locomotive, showing a modified arrangement.

The nature of my invention consists in the application of power to the driving-wheels of a locomotive or land-carriage by means of friction rollers or wheels acting at or near the periphery instead of cranks or cogs or analogous devices applied at or near the center; and, secondly, in an apparatus for stopping a locomotive or reversing its direction without reversing the engine.

A represents the main frame, which is supported upon drivers C and truck-wheels B. The axle-tree D′ supports a vibrating platform, E, upon which is secured the boiler F and engine G.

H are standards, which rise vertically from the platform E and afford journal-bearings for the main shaft I, having a drum, K. This drum K communicates motion to the pulleys L and M by means of the straight belt *l* and cross-belt *m*. The pulleys L and M are keyed fast to their shafts L′ and M′, which are journaled, respectively, to the back and front parts of the platform E. The shafts L′ and M′ are provided with friction-rollers N and O.

P is a screw provided with a hand-wheel, *p*, by means of which the platform E may be vibrated upon the axle-tree D′, so as to throw either set of friction-rollers N or O in contact with the driving-wheels C.

The front portion, R, of the platform or frame serves as a receptacle for fuel, while the rear part, S, contains the water-tank for supplying the boiler.

The operation of so much of this apparatus as relates to this invention may be readily seen. The friction-roller N, being brought in contact with the driving-wheel C, communicates motion to it and drives the locomotive forward; and this mode of applying motion will greatly economize power and prevent the wheels from slipping when starting a heavy load.

It is manifest that in propelling the locomotive but one set of friction-rollers is used at the same time, and by reversing the motion of said rollers the other pair might be entirely dispensed with; but the second branch of this invention has reference to the employment of another set, as follows: When it is desirable to reverse the motion of the drivers so as to stop the engine or to run backward, the hand-wheel *p* of the screw P is turned so as to elevate the front end and depress the rear end of platform E, which frees the rollers N from the drivers C and brings the rollers O in contact with said drivers, which immediately applies power to the drivers in the opposite direction, speedily stopping the locomotive and driving it backward without reversing the engine, which may be in constant operation. By strongly depressing the platform by means of the screw the friction-rollers on either side may be forced against the drivers so as to act as brakes.

A modified application of my improvement is shown in the longitudinal sectional view, (Fig. 2,) in which the platform E is placed upon rollers, and a horizontal screw, 2, moves it back and forth, causing friction-wheels O and N to come alternately in contact with the driving-wheels.

Having described my improvements, I wish distinctly to state that I do not limit myself to the precise form of application herein set forth; but What I do claim as of my invention and desire to secure by Letters Patent is—

1. The combination of one or more friction rollers or wheels with the driving-wheel or wheels of locomotives or land-carriages for the purpose of propelling said carriages.

2. The adjustable platform, in combination with the friction-wheels O and N and the driving-wheel C, substantially as described.

3. Reversing the movements of a locomotive by the alternate application to the drivers of friction-rollers revolving in opposite directions.

IRA C. STORY.
G. W. SKAATS.

Witnesses:
E. G. HALL,
JAMES MOORE.